United States Patent
Baumann et al.

(10) Patent No.: US 12,110,254 B2
(45) Date of Patent: Oct. 8, 2024

(54) CONCRETE-FORMING COMPOSITION

(71) Applicant: Dow Global Technologies LLC, Midland, MI (US)

(72) Inventors: Robert Baumann, Rueschlikon (CH); Jörn Breckwoldt, Hamburg (DE); Alexandra Hild, Soltau (DE); Marc Schmitz, Verden/Aller (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 517 days.

(21) Appl. No.: 17/298,709

(22) PCT Filed: Feb. 6, 2020

(86) PCT No.: PCT/US2020/016941
§ 371 (c)(1),
(2) Date: Jun. 1, 2021

(87) PCT Pub. No.: WO2020/176211
PCT Pub. Date: Sep. 3, 2020

(65) Prior Publication Data
US 2022/0048820 A1 Feb. 17, 2022

Related U.S. Application Data

(60) Provisional application No. 62/811,598, filed on Feb. 28, 2019.

(51) Int. Cl.
*C04B 24/38* (2006.01)
*C04B 28/04* (2006.01)
*C04B 111/34* (2006.01)

(52) U.S. Cl.
CPC ............ *C04B 24/383* (2013.01); *C04B 28/04* (2013.01); *C04B 2111/343* (2013.01)

(58) Field of Classification Search
CPC . C04B 24/383; C04B 28/04; C04B 2111/343; C04B 24/386; C04B 40/0675
See application file for complete search history.

(56) References Cited

U.S. PATENT DOCUMENTS

| 6,958,393 B2 | 8/2005 | Schlesiger et al. |
| 10,252,943 B2 * | 4/2019 | Gu .......................... C04B 28/04 |
| 2016/0214906 A1 | 7/2016 | Ramirez Tovias et al. |

FOREIGN PATENT DOCUMENTS

| DE | 10233788 | | 2/2004 |
| IN | 201741022033 | | 7/2017 |
| KR | 20130067748 A | * | 6/2013 |
| KR | 20160081695 | | 7/2016 |
| WO | 2017004119 | | 1/2017 |
| WO | 2017025770 | | 2/2017 |
| WO | 2017025771 | | 2/2017 |
| WO | 2018098291 A9 | | 9/2018 |

OTHER PUBLICATIONS

Schrofl, "Relation Between the Molecular Structure and the Efficiency of Superabsorbent Polymers (SAP) as Concrete Admixture to Mitigate Autogenous Shrinkage", Cement and Concrete Research, 2012, p. 865-873, vol. 42.

* cited by examiner

*Primary Examiner* — Anthony J Green

(57) ABSTRACT

A concrete-forming composition for producing a concrete article including: (a) at least one internal curing agent including a water-insoluble crosslinked cellulose ether wherein the water-insoluble crosslinked cellulose ether has a higher water adsorption capacity compared to typically used superabsorbent polymers and wherein the water-insoluble crosslinked cellulose ether can be successfully and efficiently used as a water-insoluble crosslinked cellulose either internal curing agent in concrete-forming compositions; and (b) a cementitious material; a process for making the above concrete-forming composition; and a concrete article made from the above concrete-forming composition with the objective of reducing autogenous shrinkage and crack formation in the resulting concrete article made from the above concrete-forming composition.

8 Claims, No Drawings

CONCRETE-FORMING COMPOSITION

FIELD

The present invention relates to concrete-forming compositions; and more specifically, the present invention relates to concrete-forming compositions including water-insoluble crosslinked cellulose ethers useful as internal curing agents for the concrete-forming compositions.

BACKGROUND

One of the main reasons for early stage cracking sensitivity of concrete is self-desiccation resulting in increased autogenous shrinkage. Introducing small water reservoirs in the concrete helps to reduce self-desiccation. The small water reservoirs can be introduced in the concrete using a variety of materials including pre-wetted lightweight aggregates, pre-wetted crushed returned concrete fines, pre-wetted wood or cellulose fibers, and superabsorbent polymers. Heretofore, superabsorbent polymers (SAP) have demonstrated significant higher effectiveness compared to lightweight aggregates, recycled concrete fines of wood fibers (for example, as described in K. Kovler, "Internal Curing of Concrete", RILEM TC 196-ICC: State-of-the-art report—June 2007, Vol. 41, Chapter 7, page 71). SAP are typically crosslinked copolymers of acrylic acid and acrylamide. The kinetics of liquid uptake into and release from the SAP depends on the ionic composition of the liquid (for example, as described in C. Schröfl, V. Mechtcherine, M. Gorges, "Relation Between the Molecular Structure and the Efficiency of Superabsorbent Polymers (SAP) as Concrete Admixture to Mitigate Autogenous Shrinkage", Cement and Concrete Research, 42, (2012), pp. 865-873). The above-mentioned references disclose that SAP with less ionic charge will desorb the water slower compared to highly anionic SAP. Desorbing the water in concrete slower is beneficial for the prevention of shrinkage cracks as the internal curing water will be available over a longer period of time. Although SAP are used today as internal curing agents for concrete, the current SAP have limited water adsorption capacity. The anionic structure of known SAP causes a rather rapid desorption of water in the cementitious matrix of concrete.

Cellulose ethers (CE) can be crosslinked with diglycidylether providing enhanced molecular weight and subsequently give higher viscosity in aqueous solutions. These cellulose ethers can be advantageously be used in cementitious tile adhesives (WO2017004119A1). When adding more crosslinker (e.g., diglycidylether) to the CE, the CE loses water solubility and cannot be used in dry mix mortar formulations. However, upon contact with water the crosslinked CE particles absorb water and swell.

Various internal curing agents for use in concrete formulations have been disclosed in the prior art. For example, U.S. Patent Application Publication No. US20160214906A1 discloses an internal curing agent consisting of cellulose fibers, tensides (surfactants), and silicones. The internal curing agent is ground together with cement to enable good mixing with the cement particles and ensure a particle size similar to the particle size of the cement providing a high specific surface which is considered to be beneficial for water adsorption. Consequently, however, water desorption in the above system will be very fast.

WO2017025771A1 discloses an internal curing agent consisting of a wax emulsion, a polyalkylene glycol, a water retention agent, and a superplasticizer. The internal curing agent composition disclosed in WO2017025771A1 is not effective in preventing autogenous shrinkage of concrete because the composition does not provide any water reservoirs in the concrete.

IN201741022033A discloses the use of a coir pith (a natural fiber extracted out of coconut husks) as an internal curing agent for concrete. The extraction of coconut fiber from coconut husks provides the coir pith by-product which is also known as cocopeat. However, similar to other known natural fibers, the coir pith natural fibers used as an additive to concrete is less effective compared to synthetic polymer additives.

WO2017025770A1 discloses an internal curing system including a mixture of an SAP, a viscosity modifier, and an inorganic salt, in water. The SAP-based internal curing system of WO2017025770A1 has similar limitations in use (such as described above) as any other known SAP-based internal curing agent.

WO2018098291A9 discloses the use of crosslinked polysaccharides in concrete. The examples for polysaccharides disclosed in WO2018098291A9 include levan, dextran and others; which are mainly low molecular weight and water-soluble polysaccharide polymers. Although the use of cellulose is mentioned in WO2018098291A9, the technology described in the reference relates to dispersants and water reducers based on a bio-based raw material. However, what is not disclosed in WO2018098291A9 is a material based on a water-insoluble crosslinked cellulose ether.

It is therefore desirable to provide an internal curing agent, such as a crosslinked cellulose ether, that has a stronger water adsorption capacity and that can retain the water over a longer period of time in a concrete matrix. It is also desired to provide a water-insoluble crosslinked cellulose ether for use as an internal curing agent for concrete formulations that can reduce autogenous shrinkage and crack formation in a concrete product.

SUMMARY

In one embodiment, the present invention is directed to a concrete-forming composition for producing a concrete article including: (a) at least one internal curing agent including a water-insoluble crosslinked cellulose ether (xCE) wherein the water-insoluble xCE has a higher water adsorption capacity compared to typically used superabsorbent polymers and wherein the water-insoluble xCE can be successfully and efficiently used as a water-insoluble xCE internal curing agent in concrete-forming compositions; and (b) a cementitious material.

In another embodiment, the present invention includes a process for making the above concrete-forming composition.

In still another embodiment, the present invention includes a concrete article made from the above concrete-forming composition.

One objective of the present invention is to reduce autogenous shrinkage and crack formation in the resulting concrete article made from the above concrete-forming composition.

DETAILED DESCRIPTION

In a broad embodiment, the concrete-forming composition of the present invention for producing a concrete article includes: (a) at least one water-insoluble xCE used as an internal curing agent for the concrete-forming composition; and (b) a cementitious material.

The internal curing agent useful in producing the concrete-forming composition of the present invention includes at least one water-insoluble xCE; and the water-insoluble xCE has the capability to adsorb more water (i.e., the water-insoluble xCE of the present invention has a higher water adsorption capacity) compared to typical superabsorbent polymers (SAP) used in known processes. In addition, the water-insoluble xCE of the present invention can be successfully and efficiently used as a water-insoluble xCE internal curing agent in concrete-forming formulations or compositions with the objective of reducing autogenous shrinkage and crack formation in the resultant concrete article made from the concrete-forming composition.

The water-insoluble xCE compound useful in the present invention as the internal curing agent in concrete-forming formulations can be any known crosslinked cellulose ether made by any conventional process of making crosslinked cellulose ethers. For example, the water-insoluble xCE useful in the present invention can include any one or more of the crosslinked cellulose ethers prepared according to the method described in U.S. Pat. No. 6,958,393 B2. In general, the process of producing a water-insoluble xCE useful in the present invention, described in U.S. Pat. No. 6,958,393 B2, includes the steps of alkalizing a cellulose with an aqueous alkali hydroxide solution in the presence of a suspending agent like dimethyl ether; reacting the alkalized cellulose with alkylene oxide(s), reacting with an alkyl halide and reacting (subsequently or simultaneously) with 0.0001-0.05 equivalents (eq) crosslinking agent (i.e. moles per mol anhydroglucose units [AGU]) forming an irreversibly crosslinked derivative product; and separating the irreversibly crosslinked derivative product from the reaction mixture, optionally purifying the product, and then optionally drying the product.

In one general embodiment, the water-insoluble xCE compound useful in the present invention as the internal curing agent in concrete-forming formulations can be prepared by crosslinking a cellulose ether which can include for example the reaction product of: (a) at least one cellulose ether selected from the group consisting of hydroxyethyl methyl cellulose, hydroxypropyl methyl cellulose, methyl cellulose, hydroxyethyl cellulose and mixtures thereof; and (b) at least one crosslinker selected from the group consisting of 1,2-dichloroethane, 1.3-dichloropropane, dichlorodiethyl ether, diglycidyl ether, glycidyl methacrylate, epichlorohydrin, epibromohydrin, and mixtures thereof. In one preferred embodiment, the crosslinker useful in the present invention can be, for example a diglycidylether type crosslinker. Exemplary of some of the commercial crosslinkers based on diglycidyl ether chemistry can include Epilox P13-42 and Epilox M985 (available from Leuna Harze); and D.E.R 732 (available from Olin).

The process described in U.S. Pat. No. 6,958,393 B2 of preparing the water-insoluble xCE useful in the present invention, can be illustrated by the following example: a mixture of 17.7 kilograms (kg) wood pulp (moisture content 3.6 weight percent [wt %]) and 17.7 kg cotton linters (moisture: 4.2 wt %) is treated with a mixture of 52.9 kg dimethyl ether and 2.0 mole equivalents (mol eq) of chloromethane (MeCl), followed (over a period of 10 minutes [min]) by 2.2 mol eq sodium hydroxide (NaOH) in the form of 50 wt % aqueous NaOH solution. After alkalization for a further 35 min at 28 degrees Celsius (° C.)–38° C., the mixture is treated over 25 min with 0.66 mol eq ethylene oxide and 0.001 mol eq of diglycidylether of structure (I) (at 60° C.-63° C.), mixed for a further 25 min at this temperature, heated over 25 min up to a temperature of 78° C.-82° C., reacted for a further 60 min at this temperature, treated over 8 min with 2 mol eq MeCl, reacted for a further 12 min, and worked up by distillation of volatiles followed by washing, drying and milling.

The water-insoluble xCE used as an internal curing agent for concrete-forming compositions exhibits several properties that are advantageous when used in concrete-forming compositions. For example, in one general embodiment, the internal curing agent useful for concrete-forming compositions includes a water-insoluble xCE having a water adsorption capacity of greater than or equal to ($\geq$) 10 gram per gram (g/g); from 10 g/g to 20 g/g in another embodiment; and from 12 g/g to 18 g/g in still another embodiment. The above water adsorption capacity of the water-insoluble xCE internal curing agent is sufficient to reduce the autogenous shrinkage in the concrete article made using the water-insoluble xCE internal curing agent to a level of, for example, less than or equal to ($\leq$) 0.4 percent (%) after 1,000 min in one embodiment.

The water adsorption capacity of the internal curing agent composition can be measured according to the "Tea Bag Test" method described herein below in the Examples.

The cementitious compound or materiel that can be mixed with the water-insoluble xCE internal curing agent can include one or more cementitious compounds known in the art. For example, in one embodiment, the cementitious compound can be Portland cement and similar cements. As aforementioned, the cementitious material mixed with the water-insoluble xCE internal curing agent can form a concrete-forming composition that can be used for producing a concrete article wherein the concrete article advantageously exhibits less shrinkage and consequently less cracking resulting in a concrete article with enhanced durability.

As is known in the art of concrete forming, other ingredients, compounds, additives or agents can be included in the concrete-forming composition. The concrete-forming composition may optionally include for example other hydraulic binders such as furnace slag, fly ash, calcium alumina cement, calcium sulfoaluminate cements, other pozzolanic binders; and mixtures thereof. The amount of the optional components can be, for example, from 0 wt % to 90 wt % in one embodiment, from 1 wt % to 90 wt % in another embodiment, from 10 wt % to 80 wt % in still another embodiment, and from 20 wt % to 50 wt % in yet another embodiment.

The process for making a concrete-forming composition can be carried out by admixing: the water-insoluble xCE internal curing agent, component (a), described above with the cementitious material, component (b), described above. In a preferred embodiment, the concrete-forming composition can be prepared using conventional mixing methods, process conditions, and equipment known in the art.

In one broad embodiment, the water-insoluble xCE internal curing agent of the present invention can be used as a curative additive for a mortar formulation; and more particularly, as an internal curing agent for a dry-mix or concrete-forming composition. In general, the process of making the dry-mix concrete formulation of the present invention includes the step of admixing: (a) the water-insoluble xCE internal curing agent described above; and (b) a cementitious material also referred to as a concrete mixture.

In general, to prepare the concrete-forming composition, the amount of the water-insoluble xCE internal curing agent, component (a), can be, for example, from 0.1 wt % to 1.0 wt % in one embodiment, from 0.2 wt % to 0.8 wt % in another embodiment and from 0.3 wt % to 0.6 wt % in still another embodiment (all wt % are based on cement).

The concrete-forming composition is useful for making concrete articles and products; and in particular, for making concrete articles and products that exhibits a reduced autogenous shrinkage and a reduced crack formation in the concrete articles and products. For example, the autogenous shrinkage (after 1,000 min of testing) of the concrete product of the present invention can be from 0.01% to 0.4% in one embodiment; from 0.05% to 0.2% in another embodiment, and from 0.10% to 0.15% in still another embodiment. The autogenous shrinkage of the concrete can be measured according to the method described herein below in the Examples under the heading "General Procedure for Measuring Shrinkage".

In general, a concrete article comprising a dried fully reacted concrete-forming composition described above can be made by first (I) making a concrete-forming composition by mixing: (a) at least one internal curing agent including a water-insoluble xCE wherein the water-insoluble xCE has a higher water adsorption capacity compared to typically used superabsorbent polymers and wherein the water-insoluble xCE can be successfully and efficiently used as a water-insoluble xCE internal curing agent in concrete formulations with the objective of reducing autogenous shrinkage and crack formation in the concrete; and (b) a cementitious material; and then (II) drying the concrete-forming composition of (I). The drying is carried out under normal climate conditions of 23° C. and 50% relative humidity as is well known by those skilled in the field of cement manufacturing.

The concrete-forming composition made in accordance with the present invention may be used to manufacture concrete articles for any application known in the art where concrete is used such as bridges, dams, roads, walls, and the like.

Examples

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) which follow are explained hereinbelow and in Table I.

"xCE" stands for crosslinked cellulose ether.
"HEMC" stands for hydroxyethyl methyl cellulose.
"PCE" stands for polycarboxylate ether.
"SAP" stands for superabsorbent polymer.
"OPC" stands for ordinary Portland cement.

TABLE I

Raw Materials

| Ingredient | Brief Description | Supplier |
|---|---|---|
| Epilox | propylene glycol-diglycidylether | Leuna Harze |
| Defosorb CL 360 | Superabsorbent polymer | Defotec |
| Defosorb CA 20 | Superabsorbent polymer | Defotec |
| Defosorb CA 50 | Superabsorbent polymer | Defotec |
| OPC CEM I 42.5 R | Ordinary Portland cement | Heidelberger Cement |
| Sand H32 | Quartz sand | Local supply |
| Sand 0.2/1 | Quartz sand | Local supply |
| Sand 1/2 | Quartz sand | Local supply |
| Glenium 51 | Polycarboxylate ether | BASF |

The process used herein for crosslinking a cellulose ether is based on diglycidylether chemistry and is described, for example, in U.S. Pat. No. 6,958,393. Briefly, the crosslinking agent can be a propylene glycol-diglycidylether such as Epilox; and the crosslinking agent is added, together with the other educts (Methyl chloride (MCL), Dimethylether (DME), Ethylene oxide (EO)) and high pressure, in an etherification step of a production process of HEMC (80° C.).

If the crosslinker level is high enough, water swellable polymers based on cellulose ether can be generated. A characterization of deployed cross-linked cellulose ethers is given in Table II below.

TABLE II

Cellulose Ethers

| Example No. | Crosslinked Cellulose Ether Sample Designation | Epilox - Crosslinker [mol/mol] | 1% Aqueous Viscosity [mPa · s] |
|---|---|---|---|
| Inv. Ex. 1 | xCE-001 | 0.0075 | 1,600 |
| Inv. Ex. 2 | xCE-002 | 0.0100 | 570 |
| Inv. Ex. 3 | xCE-003 | 0.0250 | 2 |
| Inv. Ex. 4 | xCE-004 | 0.0050 | 231 |
| Inv. Ex. 5 | xCE-005 | 0.0100 | 374 |
| Inv. Ex. 6 | xCE-006 | 0.0150 | 320 |

As described in Table II, the crosslinkers xCE-001 to xCE-003 demonstrate how an increase of crosslinking agent leads to a decrease of the aqueous viscosity of the crosslinked cellulose ethers indicating an increase in an insoluble fraction. The cellulose ethers used in Inv. Ex. 1-3 (xCE-001 to xCE-003) described in Table II were based on cotton linters having a high molecular weight, which is measured as intrinsic viscosity of 1,720 milliliters/gram (mL/g). The cellulose ethers used in Inv. Ex. 4-6 (xCE-004 to xCE-006) were based on wood pulp with a lower molecular weight (intrinsic viscosity 640 mL/g). The molecular weight of cellulose is measured as intrinsic viscosity according to ISO 5351.

The results described in Table II, show that with increasing crosslinker level, the viscosity (in millipascals seconds [mPa·s]) of a 1% aqueous solution of a cellulose ether decreases as the amount of soluble cellulose ether polymers decreases. Generally, the 1% aqueous viscosity of a 1% aqueous solution of the water-insoluble crosslinked cellulose ether of the present invention can be from 1 mPa·s to 2,000 mPa·s in one embodiment; from 10 mPa·s to 1,000 mPa·s in another embodiment, and from 100 mPa·s to 500 mPa·s in still another embodiment. The viscosity of a 1% aqueous solution of a cellulose ether can be measured as described herein below.

Viscosity Measurement of 1% Aqueous Solution of Cellulose Ether

A 1% aqueous solution of cellulose ether is prepared by dispersing 4 grams (g) of HEMC quickly (30 s) in 396 g water and 0.5 mL of tributyl-phosphate at room temperature (about 23° C.) using a high-speed stirrer (2,500 revolutions per minute [RPM]) to avoid the formation of lumps. The further dissolution process takes place during at least 1.5 hour within slowly rotating glass vessels. The viscosity of the above prepared 1% aqueous solution of cellulose ether is measured at 20° C. and a shear rate of 2.55 s$^{-1}$ using a HAAKE™ Viscotester™ 550 rotation viscometer with MV2DIN geometry (available from Thermo Fisher Scientific).

Water Adsorption Capacity

The water adsorption capacity of the polysaccharides can be compared to commercially available SAP that are used as internal curing agents. The water adsorption capacity of crosslinked cellulose ethers can be measured by a so-called "Tea Bag Test" described herein below. The results of the Tea Bag Test of the crosslinked cellulose ethers are described in Table III.

TABLE III

Water Adsorption Capacity of Cellulose Ethers

| Example No. | Crosslinked Cellulose Ether Sample Designation | Water Adsorption Capacity [g/g] |
|---|---|---|
| Comp. Ex. A | blank reference | 0.61 |
| Inv. Ex. 1 | xCE-001 | 14.5 |
| Inv. Ex. 2 | xCE-002 | 15.5 |
| Inv. Ex. 3 | xCE-003 | 12.6 |
| Inv. Ex. 4 | xCE-004 | 15.6 |
| Inv. Ex. 5 | xCE-005 | 15.1 |
| Inv. Ex. 6 | xCE-006 | 12.9 |
| Comp. Ex. B | Defosorb CL 360 | 10.7 |
| Comp. Ex. C | Defosorb CA 20 | 7.4 |
| Comp. Ex. D | Defosorb CA 50 | 9.0 |

Water Adsorption Capacity Measurement (Tea Bag Test)

The determination of the water adsorbing capacity of a given water adsorption polymer (WAP) has been developed for the hygiene industry and is referred to in the standard EDANA 440.2-02 (European Disposables and Nonwovens Association). The standard describes the use of a 0.9 percent sodium chloride test solution. Aqueous cementitious systems contain high content of calcium ions and the swelling capacity of polymers is highly reduced in the presence of ions, because ions can cause a collapse of the gel by cross-linking the polymers. For this reason, the test solution was exchanged by a 1.0 percent calcium formate solution to make the test more applicable for applications in the construction industry.

The above water adsorbing capacity test method which, as aforementioned, is also known as the "Tea Bag Test", is performed by a defined amount (about 200 milligrams [mg]) of polymer in a cotton sachet, which is immersed for 30 min in a one-percent calcium formate solution. Then the sachet is allowed to drain for 5 min and weighed afterwards. A sachet without superabsorbent polymer is also tested as a blank. To calculate the capacity, the following formula can be used:

$$\text{Water Adsorption Capacity} = \frac{\text{Final Weight} - \text{Blank Weight} - \text{Sample Weight}}{\text{Initial Weight}} (g/g)$$

All polymers were tested with an adjusted particle size distribution of 100% of <0.125 millimeters (mm).

The superabsorbent polymers were obtained from Defotec.

The results clearly demonstrate that crosslinked cellulose ethers do have a higher water adsorption capacity than acrylic SAPs.

Shrinkage

The shrinkage test in a cement mortar were performed based on the procedure described herein below. All application tests were conducted using a mortar formulation described in Table IV.

TABLE IV

Mortar Formulation

| Component | Description | Material | Amount [g] |
|---|---|---|---|
| A | Dry Mix | OPC CEM I 42.5 R | 500 |
| | | Sand H32 | 600 |
| | | Sand 0.2/1 | 500 |
| | | Sand 1/2 | 400 |
| | | SAP/crosslinked CE | 2.5 |
| B | Liquid | Glenium 51 | 5 |
| | | Water (water/cement ratio: 0.50) | 250 |

General Procedure for Preparing a Mortar Formulation

A mortar formulation was prepared by first preparing a dry mix mixture, component A, as described in Table IV followed by combining the dry mix mixture with a wet (liquid) mixture, component B, as described in Table IV. The components A and B are combined in a mixing bowl for a ToniMIX mixer (available from Toni Technik Baustoffprüfsysteme GmbH). As described in Table IV, the components of the wet mixture, component B, are water and a PCE-based superplasticizer, Glenium 51. While mixing the wet mixture, component B, on level one (low speed) of the mixer, the dry mix, component A, was added to the mixing bowl within 30 seconds (s) resulting in a paste material. The resulting paste was mixed for 30 s on level one of the mixer; and then for 30 s on level two (high speed) of the mixer. The resulting paste mixture was allowed to rest for 90 s to allow the dissolvable additives to dissolve. Then, the paste mixture was mixed again for 60 s on level two of the mixer.

General Procedure for Measuring Shrinkage

A shrinkage-mold of 100 mm length was built according to DIN EN ISO 6873. Two nuts were built in at each end of the mold so that the hardening mortar will be connected to the mold wall at these points. One end is fixed and the other end is freely movable where the deformation of the specimen can be measured.

By filling the mortar in the mold, the free movable part is fixed by a screw. The screw is released after the mortar is completely filled in and the mortar begins to set and is not liquid anymore. After releasing the screw, the measurement of the deformation begins.

With this setup both types of deformation, shrinkage and swelling, can be monitored with an accuracy of 0.001 mm

TABLE V

Results of Shrinkage Measurements

| | Example No. | | | | |
|---|---|---|---|---|---|
| Shrinkage [%] after: | Comp. Ex. A Base Material | Comp. Ex. B Defosorb CL 360 | Inv. Ex. 4 xCE-004 | Inv. Ex. 5 xCE-005 | Inv. Ex. 6 xCE-006 |
| 200 min | 0 | −0.11 | −0.02 | −0.02 | −0.02 |
| 600 min | −0.26 | −0.32 | −0.17 | −0.11 | −0.04 |
| 1,000 min | −0.46 | −0.46 | −0.21 | −0.13 | −0.05 |

The shrinkage data described in Table V above is obtained at various periods of time. After 1,000 min, the shrinkage data described in Table V clearly indicates that the water-insoluble crosslinked cellulose ethers of the present invention are superior to conventional superabsorbent polymers. It was found that the higher the crosslink density, the lower the shrinkage will be. The crosslinker, xCE-006, of Inv. Ex. 6 demonstrates the best control of shrinkage.

What is claimed is:

1. A concrete-forming composition for producing a concrete article comprising:
   (a) at least one internal curing agent including a water-insoluble crosslinked cellulose ether wherein the water-insoluble crosslinked cellulose ether has a water adsorption capacity of greater than or equal to 10 g/g as measured by the tea bag test method and a 1% aqueous viscosity of from 2 to 2,000 mPa·s and wherein the water-insoluble crosslinked cellulose ether can be successfully and efficiently used as a water-insoluble crosslinked cellulose ether internal curing agent in concrete formulations with an objective of reducing autogenous shrinkage and crack formation in the concrete; and
   (b) a cementitious material.

2. The composition of claim 1, wherein the at least one water-insoluble crosslinked cellulose ether internal curing agent comprises the reaction product of:
   (a) at least one cellulose ether selected from the group consisting of hydroxyethyl methyl cellulose, hydroxypropyl methyl cellulose, methyl cellulose, hydroxyethyl cellulose and mixtures thereof; and
   (b) at least one crosslinker selected from the group consisting of 1,2-dichloroethane, 1.3-dichloropropane, dichlorodiethyl ether, diglycidyl ether, glycidyl methacrylate, epichlorohydrin, epibromohydrin, and mixtures thereof.

3. The composition of claim 1, wherein the cementitious material is Portland cement.

4. The composition of claim 1, wherein the concentration of the water-insoluble crosslinked cellulose ether internal curing agent is from 0.1 weight percent to 5 weight percent based on the weight of total compounds in the composition.

5. The composition of claim 1, wherein the concentration of the cementitious material is from 5 weight percent to 50 weight percent based on the weight of total compounds in the composition.

6. A concrete article comprising a dried fully reacted concrete-forming composition of claim 1.

7. A process for making a concrete-forming composition comprising admixing:
   (a) at least one internal curing agent including a water-insoluble crosslinked cellulose ether wherein the water-insoluble crosslinked cellulose ether has a water adsorption capacity of greater than or equal to 10 g/g as measured by the tea bag test method and a 1% aqueous viscosity of from 2 to 2,000 mPa·s and wherein the water-insoluble crosslinked cellulose ether can be successfully and efficiently used as a water-insoluble crosslinked cellulose ether internal curing agent in concrete formulations with an objective of reducing autogenous shrinkage and crack formation in the concrete; and
   (b) a cementitious material.

8. A process for making a concrete article comprising:
   (I) mixing:
      (a) at least one internal curing agent including a water-insoluble crosslinked cellulose ether wherein the water-insoluble crosslinked cellulose ether has a water adsorption capacity of greater than or equal to 10 g/g as measured by the tea bag test method and a 1% aqueous viscosity of from 2 to 2,000 mPa·s and wherein the water-insoluble crosslinked cellulose ether can be successfully and efficiently used as a water-insoluble crosslinked cellulose ether internal curing agent in concrete formulations with an objective of reducing autogenous shrinkage and crack formation in the concrete; and
      (b) a cementitious material; wherein a concrete-forming composition is formed; and
   (II) drying the concrete-forming composition of (I).

* * * * *